May 22, 1928.  
C. T. RAY  
HARROW  
Filed Feb. 20, 1925

1,670,521

Inventor:
CHARLES T. RAY.
By C. J. Stockman
Attorney

Patented May 22, 1928.

1,670,521

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

HARROW.

Application filed February 20, 1925. Serial No. 10,573.

This invention relates to improvements in harrows, and more particularly to fastening means for attaching a harrow tooth to the supporting bar of a harrow.

The primary object of the invention is to provide a tooth clamp which will effectively hold a harrow tooth in position on the harrow supporting bar without the use of bolts, screws and the like, thereby eliminating the necessity of punching holes in the harrow supporting bar and at the same time providing a clamp which will not allow the tooth to become loosened by use in the field.

A further object of the invention is to provide a tooth clamp having yielding or resilient characteristics which will permit its arms to be spread apart in the operation of driving the tooth to its place and by reason of the tendency to constantly return to their original positions, to always exert sufficient force on the tooth to prevent the latter from accidently loosening.

A still further object is to provide a correlation of tooth bar, resilient tooth clamp and harrow tooth such that the operation of driving the tooth to its place will cause the clamp to move transversely of the tooth bar and its arms to spread apart and the tooth to be thereby tightly clamped against the bar.

Teeth of various shapes may be used with the present clamp but it is preferred to use a tooth of triangular section, which gives a wide bearing against the harrow tooth bar and at the same time provides a pointed edge at the front or working part of the tooth, to facilitate cutting through the soil.

With the foregoing objects outlined and with other objects in view which will appear as the description proceeds, the invention consists in the novel features hereinafter described in detail, illustrated in the accompanying drawing and more particularly pointed out in the appended claims.

Figures 1, 2, 3:
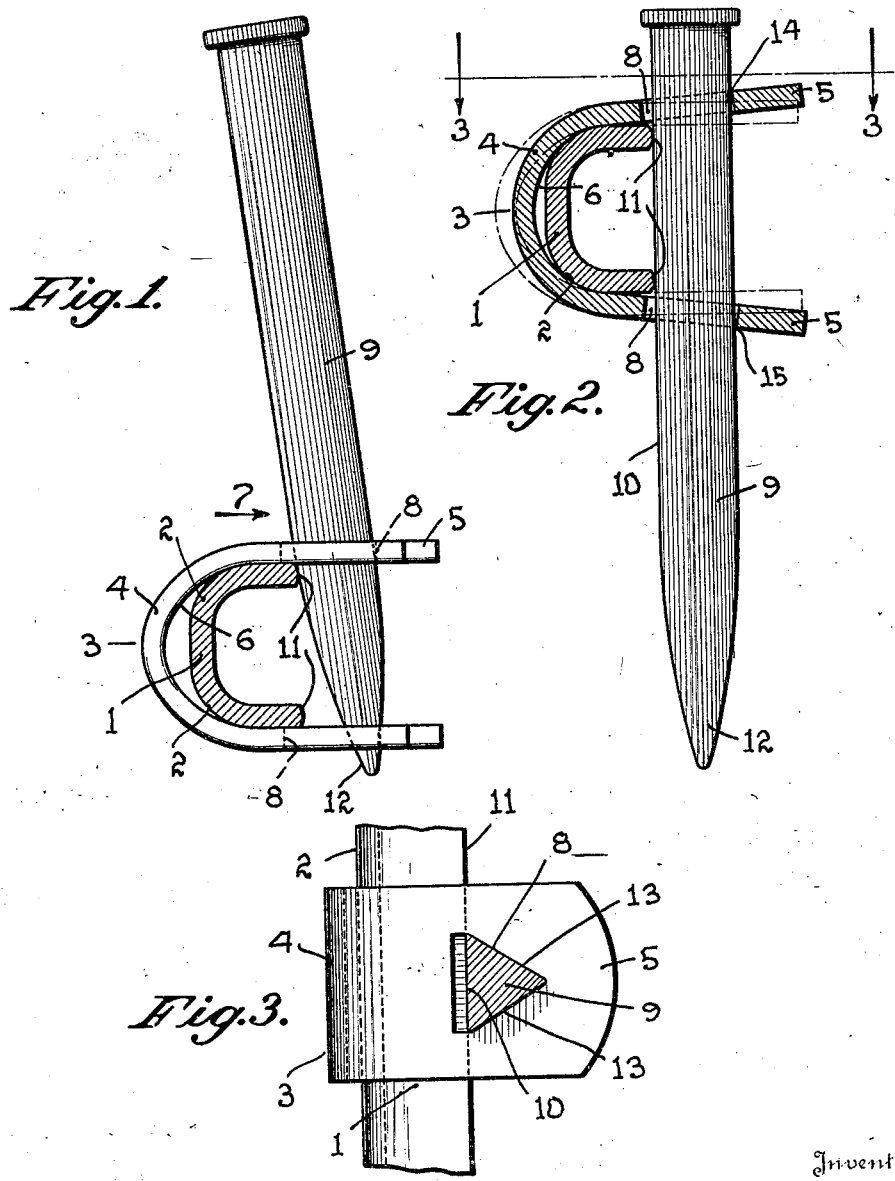
Figure 1 is a side view of the improved clamp fitted over a harrow tooth bar, and showing a harrow tooth just after it has been passed into the lower hole of the clamp.
Fig. 2 is a vertical sectional view of the tooth bar and clamp and a side view of the tooth after the latter has been driven into position.
Fig. 3 is a plan view taken on line 3—3 of Fig. 2.

In the drawing, 1 designates the tooth bar of a harrow, and this bar is preferably of channel-shaped sheet metal to provide a strong and inexpensive structure. Of course, the bar may be made in various ways but it is desirable to have the same provided with two oppositely disposed outer curved surfaces 2, for a purpose hereinafter described. Even if the bar 1 be made solid (that is without a channel) the surfaces 2 should be provided, as they function as camming means for the clamp, as will be explained later. The clamp 3 is preferably of U-shape and is made of steel with an analysis which will provide relatively stiff resilient material. The clamp includes a crosshead 4 and the arms 5. The inner surfaces 6 near the ends of the cross head 4 are curved on arcs having a greater radius than the radii of the surfaces 2, whereby when the clamp is moved in the direction of the arrow 7 relatively to the stationary bar 1, the surfaces 2 will act on the surfaces 6 and cause the latter to wedge or cam outwardly, for the purpose of spreading the arms 5 apart, in the manner shown in Fig. 2.

Each arm 5 has an aperture 8 to receive a harrow tooth 9, and as before stated, the harrow tooth is preferably of triangular section, as shown, so that its broad rear surface 10 will abut against the front edges 11 of the bar 1 to provide a good bearing for the tooth on the bar.

It may be clearly seen from the drawing that each aperture 8 is of greater area than the thickness of the tooth 9, to provide a clearance space to permit the arms 5 of the clamp to diverge in the manner shown in Fig. 2.

When the lower pointed end 12 of a tooth is inserted into the upper hole 8 and driven downwardly, the tooth upon entering the aperture in the lower arm 5 will have a tendency to wedge between the edges 11 of the tooth bar and the edges 13 of the apertures 8 and consequently the clamp will be pulled forward in the direction of the arrow 7. As the clamp moves forward the surfaces 6 will ride on the surfaces 2 and as a result the arms 5 will be spread, so that the upper extremity 14 of the front edge of the upper aperture 8 and the lower extremity 15 of the front edge of the lower aperture 8, will tend to bite into the tooth 9 and prevent the latter from moving up or down.

Owing to the resiliency of the metal of the clamp 3, the clamp has a tendency to always return to the position shown in Figure 1, and consequently it constantly pulls on the front portion of the tooth 9 and forces the rear surface 10 of the latter against the edges 11. Therefore, after a tooth has been driven into position, it will remain fixed in this position.

From the foregoing, it is believed that the construction, operation and advantages of the invention may be readily understood and it is obvious that various changes may be made in the details disclosed without departing from the spirit of the invention as expressed in the claims.

What is claimed and desired to be secured by Letters Patent is:

1. The combination with a harrow tooth bar, of a distortable clamp for engagement therewith, said clamp comprising oppositely resilient arms having registering openings, and a harrow tooth driven through the openings and while being so driven co-operating with the bar to distort the clamp by spreading said arms apart to thereby cause a secure binding of the tooth between the clamp and the bar.

2. The combination with a harrow tooth bar, of a substantially U-shaped distortable clamp which extends around one of two opposite sides of the bar and whose arms are oppositely resilient and are formed with openings lying in a plane forward of the other of the opposite sides of the bar, and a harrow tooth which is driven through said openings and is engaged with the adjacent side of the bar and a wall of an opening and while being so driven relatively to the bar and clamp causes a spreading of the arms of the clamp to securely bind the tooth between the clamp and the bar.

3. The combination with a harrow tooth bar and a substantially U-shaped distortable clamp, said bar and clamp having curved confronting surfaces in direct engagement with each other at separated places respectively adjacent the top and bottom of the bar, the curvature of the bar and clamp being on different radii, and said clamp having its arms formed with openings; of a harrow tooth driven through said openings and in its movement causing a spreading of the arms of the clamp to securely bind the tooth between the clamp and the bar.

4. The combination with a harrow tooth bar having oppositely disposed cam surfaces, of a distortable clamp mounted upon and movable relatively to the bar and having registering openings at the side of the bar opposite said cam surfaces, the clamp also having surfaces which co-act with the cam surfaces of the bar to cause a spreading apart of the arms when the clamp is moved in one direction, and a harrow tooth which is driven through said arms, to so move the clamp and thereby cause the binding of the tooth between the clamp and bar.

5. In combination, a harrow tooth bar, a substantially U-shaped distortable clamp embracing the bar, said clamp having apertures, a tooth extending through said apertures, and coacting cam surfaces on the bar and clamp for causing the arms of the clamp to spread apart when the tooth is driven into said apertures, whereby certain edges of the apertures tend to bite into the tooth.

6. In combination, a harrow tooth bar provided at one side with spaced upper and lower edges and at its opposite side with spaced cam surfaces, a substantially U-shaped resilient clamp embracing the bar and having cam surfaces co-acting with the cam surfaces of the bar to cause the arms of the clamp to spread apart when the clamp is moved in one direction relatively to the bar, the arms of said clamp having apertures extending forwardly of the upper and lower edges of the bar, and a tooth driven through said apertures and bearing against said edges of the bar, to pull the clamp in the direction to cause the arms of the clamp to spread apart and secure the tooth in position between the clamp and bar.

7. In combination, a harrow tooth bar, a substantially U-shaped resilient clamp embracing the bar and having arms provided with substantially triangular shaped apertures, and a tooth of substantially triangular shape in cross section and driven through said apertures, to pull the clamp in one direction relatively to the bar and securely bind the tooth between the clamp and the bar.

8. The combination with a harrow tooth bar having spaced upper and lower edges at one side and spaced cam surfaces at its opposite side, a substantially U-shaped distortable clamp embracing the bar and having arms projecting outwardly beyond said edges, said clamp having cam surfaces to coact with the cam surfaces of the bar for causing spreading of the arms of the clamp apart when the clamp is moved in one direction relatively to the bar, said clamp having substantially triangular apertures in its arms, and a tooth which is substantially triangular in cross section and is driven through the apertures and bears against said edges of the bar and certain edges of the apertures to spread the arms apart and clamp the tooth in position.

9. The combination with a harrow tooth bar, a clamp mounted upon said bar and movable transversely thereof and having resilient members and substantially alined apertures whose inner ends are inward of the plane of the corresponding side of the bar, and a harrow tooth of less area than that of either aperture and which in the operation of driving it into place will cause movement of the clamp relatively to the bar and place said resilient members under tension.

In testimony whereof I affix my signature.

CHARLES T. RAY.